United States Patent Office 3,138,180
Patented June 23, 1964

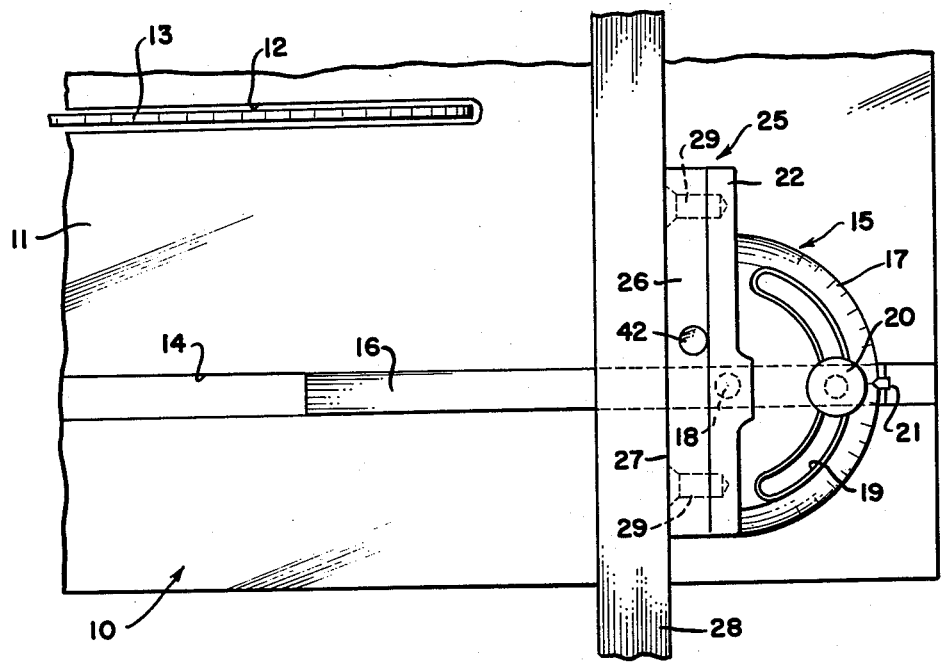
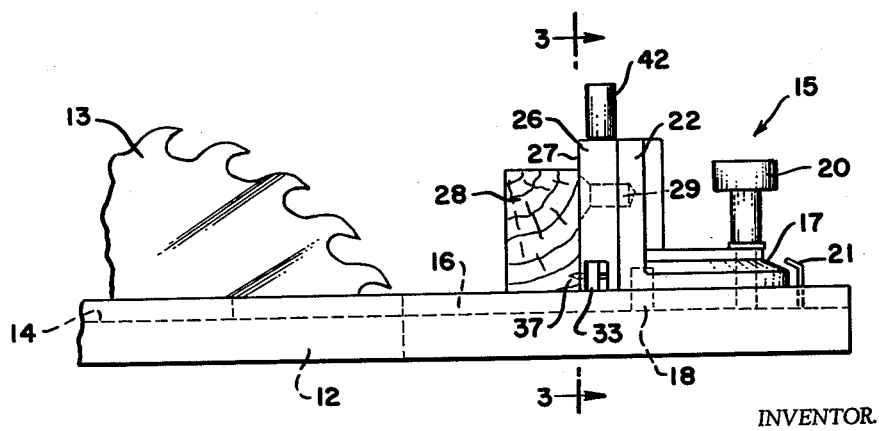
INVENTOR.
RICHARD G. SCHULTZ
BY Cullen, Sloman & Canton
ATTORNEYS

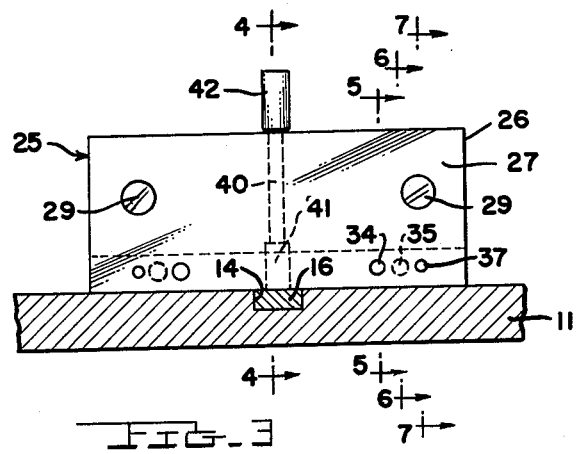
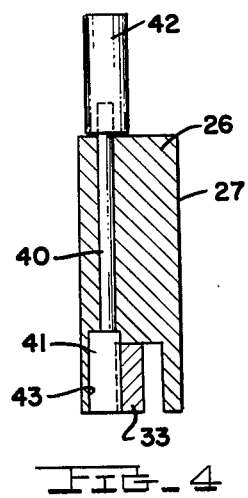
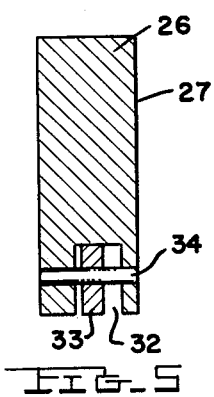
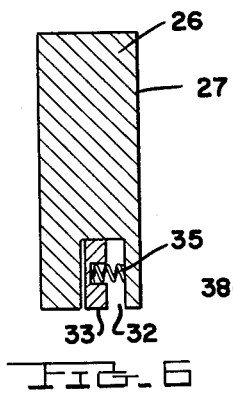
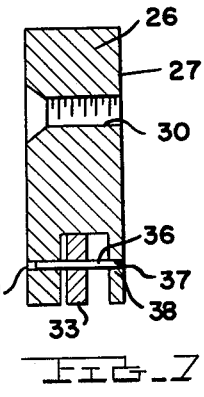
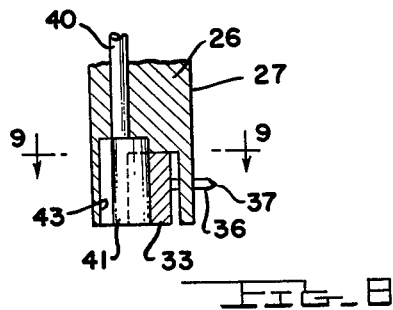
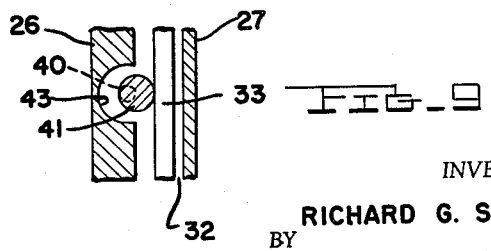

3,138,180
TABLE SAW GUIDE ATTACHMENT
Richard G. Schultz, 29618 Ann Arbor Trail,
Garden City, Mich.
Filed May 1, 1963, Ser. No. 277,150
6 Claims. (Cl. 143—169)

This invention relates to a table saw guide attachment and more particularly to an attachment useful in connection with table saw miter gages for guiding and clamping a wood workpiece.

It is conventional to use a miter gage, having a workpiece guide surface which may be angularly adjusted relative to the direction of cut of the table saw, for guiding and backing up a workpiece being cut. Conventionally, the workpiece is held manually against the guide surface of the miter gage and is slid along such surface until the portion of the work to be cut is aligned with the saw blade. At that point, the workpiece is gripped, manually, against the guide surface and the miter gage is slid in a direction which moves the workpiece to the saw blade.

In such operation, the workpiece frequently shifts, inadvertently, relative to the guide surface thus undesirably shifting the location of the cut. Hence, it is an object of this invention to provide an attachment, for the miter gage and the like, which functions as a guide surface along which the workpiece may be guided and which includes a means for gripping and non-shiftably holding the guided surface of the workpiece.

A further object of this invention is to provide a simplified guide and holding attachment formed with retractable pins and means for retracting and exposing the pins so that a workpiece may be guided and freely moved along the guide surface, but once positioned, the pins may be exposed to bite into and hold the workpiece against shifting relative to the guide surface.

These and other objects and advantages of this invention will become apparent upon reading the following description, of which the attached drawings form a part.

In these drawings:

FIG. 1 is a plan view of a fragmentary portion of a table saw and of a miter gage and workpiece.

FIG. 2 is an elevational view of FIG. 1.

FIG. 3 is an end view taken in the direction of arrows 3—3 of FIG. 2.

FIGS. 4, 5, 6 and 7 are enlarged, cross-sectional views of the attachment, per se, showing the pins retracted, and taken in the direction of arrows 4—4, 5—5, 6—6, and 7—7 of FIG. 3, respectively.

FIG. 8 is a fragmentary view of the attachment, per se, similar to the view of FIG. 4, but showing the pins exposed for biting into a workpiece.

FIG. 9 is a fragmentary view taken in the direction of arrows 9—9 of FIG. 8.

FIGS. 1 and 2 illustrate a conventional table saw 10 having a support table 11 with a saw blade slot 12 through which a circular saw blade 13 extends. The table is provided with one or more guide grooves 14 within which the guide rod 16 of a miter gage 15 is slidably arranged.

The miter gage 15 includes a protractor portion 17 pivotally connected by a pivot pin 18 to the guide rod 16 and having an arcuate slot 19 through which a fastener screw 20 is arranged for fastening the protractor at predetermined angles relative to the guide rod 16. A protractor indicator or pointer 21, fastened to the end of the guide rod 16 indicates the angle of adjustment of the protractor relative to the guide rod.

The gage also includes a guide portion 22 for guiding and backing up a workpiece. The above described structure is all conventional.

The novelty herein relates to guide and securing attachment 25 which is in the form of an elongated, vertically arranged plate 26 having a guide face 27 against which the wood workpiece 28 is rested and slid. The plate is secured to the miter gage guide portion 22 by fastener screw 29 fitted in threaded openings 30 formed in the plate (see FIG. 7).

A downwardly opening groove 32 is formed in the lower edge of plate 26. Fitted within the groove is a bar 33 whose thickness is considerably less than the width of the groove so that it may be moved back and forth within the groove, i.e., towards and away from the guide surface 27. The bar is guided and held within the groove by means of guide shafts or pins 34 journalled in openings formed in the bar (see FIG. 5).

The bar is normally held in a position remote from the guide surface 27 by means of coil springs 35 pressing against and arranged between the bar and the side of the groove adjacent the guide surface 27 (see FIG. 6).

Fastened to the bar 33 are clamping pins 36 having sharpened points 37 which extend through openings 38 connecting the groove and the guide surface 27. The opposite ends of the pins are guided in openings 38a (see FIG. 7). Thus, movement of the bar 33 towards the guide surface 27 results in the sharpened points 37 of the pins 36 extending outwardly of the guide surface to pierce or bite into and hold the wood workpiece 28 against shifting once it is set in position (see FIG. 2). On the other hand, movement of the guide bar under the influence of spring 35 in the opposite direction results in retraction of the pins 36 (see FIG. 7).

Normally, the guide bar is held by the spring 35 in the pin retracted position, as shown in FIG. 7. To move the bar into the position where the pins are exposed, a cam means is provided (see FIGS. 4, 8 and 9). This cam means comprises a shaft 40 vertically journalled through plate 26 with the lower end of the shaft being enlarged into a cam portion 41, which is axially offset relative to the shaft portion 40, and is positioned within a cam receiving opening 43 (see FIG. 9). Thus, rotation of the shaft 40 causes the cam portion 41 to rotate and thus, to press against the center of the bar 33 and move the bar against the pressure of the springs 35. A handle 42 is secured to the upper end of shaft 40 for manually grasping and rotating it.

The attachment plate 26 may be formed integral with the miter gage or it may be secured to a conventional miter gage by means of the fastening screws 29 as illustrated. Once it is fastened in position and the miter gage is arranged upon the table 11, the workpiece is slid along the guide face 27 until it is properly aligned with the saw blade 13. During this time the bar 33 is arranged in the position shown in FIG. 7, with the pins 36 retracted. When the workpiece is properly positioned for cutting, the user of the device holds the workpiece with one hand and with the other hand turns the handle 42 to rotate the shaft 40 and thus rotate the off center enlarged cam portion 41 to cam the bar 33, against the pressure of springs 35, towards the guide face 27, thus exposing pins 36 (see FIG. 8). Here, the sharpened points 37 of the pins 36 bite into the wood and hold the wood against slidably shifting relative to the guide face 27. Then, the user may replace both hands upon the workpiece and move the miter gage along the direction of groove 14 to make the desired cut in the wood.

To retract the pins 36, the handle 42 is again rotated, releasing the pressure of the cam 41 against the bar 33, so that the springs 35 return the bar to its pin retracted position.

This invention may be further developed within the scope of the following attached claims. Accordingly, it is desired that the foregoing description be read as being merely illustrative of an operative embodiment of this invention and not in a strictly limited sense.

I now claim:

1. A workpiece guide and securing attachment for table mounted power saw miter gages and the like, comprising a vertically arranged, horizontally elongated guide plate having an exposed, smooth, workpiece guide face and an opposite contact face; means for securing the plate to the guide surface of a miter gage and the like with said contact face in face to face contact with said guide surface, so that workpieces may be guided in contact with said guide face; a downwardly opening groove formed in the lower edge of said plate and an elongated bar fitted in said groove, the thickness of the bar being considerably less than the width of the groove so that the bar may be moved, within and transversely of the groove, towards and away from the guide face; at least one horizontally directed opening formed in the plate and extending from the guide face to the groove, and a pin slidably fitted in the opening and secured to the bar, the pin being of a length to extend horizontally outwardly of the guide face when the bar is moved towards the guide face and to be retracted within the opening when the bar is moved away from the guide face; the exposed end of the pin being sharpened for piercing and holding the workpiece, at the lower edge of said plate, from sliding relative to the guide face; and means for normally holding the bar away from the guide face and cam means for manually moving the bar towards the guide face and thus exposing the sharpened end of the pin, with both of said means being contained within the plate so that the opposite faces of the plate are unobstructed.

2. A construction as defined in claim 1, and said means for normally holding the bar away from the guide face comprising a spring arranged within said groove and positioned between and pressed against the bar and the side of the groove nearest to the guide face for spring urging the bar from the guide face.

3. A construction as defined in claim 1, and said cam means comprising a shaft rotatably journalled within said plate and extending from the upper end to the lower end of the plate and arranged perpendicular to the bar, the lower end of the shaft being of an enlarged diameter, but offset axially relative to the upper end of the shaft and arranged in contact with said bar in said groove, the upper end of the shaft having a portion extending upwardly beyond the upper end of the plate for manually grasping and rotating it for thus camming the bar towards the guide face.

4. A construction as defined in claim 1 and wherein the opposite end of said pin is extended beyond the groove and is slidably received in an aligned opening formed in said plate at said groove for guiding the movement of the pin and the bar to which it is secured.

5. A construction as defined in claim 1, and including guide shafts extending across and mounted within the groove and journalled through transverse openings formed in said bar for supporting and guiding the movement of the bar transversely of the groove.

6. An attachment for guiding and clamping wood workpieces upon a table-like support, comprising a horizontally elongated plate having one face formed as a smooth guide face normally arranged in a vertical plane and an unobstructed opposite surface for engagement against a predetermined guide surface, with the lower, long edge of the plate rested upon said support; a downwardly opening groove formed in the lower edge of said plate, and an elongated bar fitted in said groove, the bar being of a size to freely move within the groove in a direction towards and away from the guide face; horizontally directed openings formed in the guide face and extending into said groove and a sharp pointed pin slidably fitted in each of said openings for horizontal sliding movement outwards of said guide face, with the points of the pins being arranged at the guide face, and the pins being arranged transversely to and secured to said bar, spring means arranged in the groove and pressed against the bar for spring urging the bar away from the guide face; and manually operable cam means arranged in the groove for pressing the bar towards the guide face; the pins being of a length to be retracted when the bar is spring held away from the guide face and to be extended outwardly of the guide face, for piercing the surface of a wood workpiece, when the cam means is operated to move the bar towards the guide face.

References Cited in the file of this patent

UNITED STATES PATENTS

| | | |
|---|---|---|
| 1,026,721 | Thomas | May 21, 1912 |
| 1,692,338 | Fox | Nov. 20, 1928 |